United States Patent [19]
Rittenhouse et al.

[11] 3,802,266

[45] Apr. 9, 1974

[54] FABRICATED NUTATING DISC LIQUID METER

[75] Inventors: Howard E. Rittenhouse; James C. Prestridge, both of Rogers, Ark.

[73] Assignee: Crane Co., New York, N.Y.

[22] Filed: July 17, 1972

[21] Appl. No.: 272,562

[52] U.S. Cl. .................................. 73/273, 73/258
[51] Int. Cl. .......................... G01f 1/00, G01f 3/12
[58] Field of Search ............ 73/232, 253, 255, 239, 73/258, 272 R, 273, 277, 256, 257

[56] References Cited
UNITED STATES PATENTS

| | | | |
|---|---|---|---|
| 3,289,476 | 12/1966 | Brette | 73/258 |
| 741,251 | 10/1903 | Lambert | 73/277 |
| 1,855,277 | 4/1932 | Bassett | 73/273 |
| 3,413,851 | 12/1968 | Curtiss et al. | 73/258 |

FOREIGN PATENTS OR APPLICATIONS
868,838  10/1941  France .................................. 73/273

*Primary Examiner*—Richard C. Queisser
*Assistant Examiner*—John P. Beauchamp
*Attorney, Agent, or Firm*—George S. Schwind

[57] ABSTRACT

A liquid meter having a fabricated meter housing comprising two spherical stamped halves which are positioned together diagonally whereby each half is adapted to receive a conduit. The halves, which are initially identical, are secured together by a sealing ring having a tear strip, or by a clamping means, for obtaining access to the measuring chamber which is positioned within the meter housing. The liquid meter also includes a novel floating chamber arrangement and frost bottom protection provision.

15 Claims, 4 Drawing Figures

FABRICATED NUTATING DISC LIQUID METER

BACKGROUND AND SUMMARY

This invention relates to improvements in fluid meters, and in particular to the housings and measuring device enclosed thereby.

Although the invention disclosed herein may be applied to various types of fluid meters, its primary application is in domestic water meters wherein a metering device is placed within the housing in the path of the incoming fluid. The measuring device actuates a register, which permits visual observation of the quantity of fluid passed through the meter. Normally, the register section is isolated from contact with the fluid by providing separate housings for the register and metering device. Driving of the register can be accomplished through a packing gland arrangement, or, a magnetic coupling is used to form a driving connection between the register and metering device, in a manner well known in the art.

Although a nutating disc type of measuring device is shown herein with other meter components, it is understood that other forms of measuring devices could be employed, such as pistons, gears, etc., without departing from the scope of the invention.

Present meters utilize a housing which is normally molded of metal or plastic composition and is subsequently machined to accept the measuring chamber, conduits, register, and other components which comprise the completed meter. Such moldings are relatively heavy to provide for adequate structural strength to resist breakage, and possible deformation. However, such meters have certain basic disadvantages such as high cost, both in material and labor, to manufacture. Additionally, high investment costs in molds and foundry equipment diminish the appeal for such type of meter housing.

The primary object of the present invention is to provide a fabricated housing for a meter which is structurally strong, and which substantially reduces the cost of conventional meters.

Another object is to provide a fluid meter with a novel measuring chamber which is allowed to float meter housing.

Another object is to provide a meter housing which is fabricated from two identical formed stamped members which are subsequently joined to form said housing.

Another object is to provide a fabricated meter housing assembly wherein access to the measuring device is achieved by a simple tear strip or clamping arrangement which retains the two parts of the meter together.

Another object is to provide a fabricated meter housing which has a concave bottom portion adapted to deform and thereby increasing the internal liquid volume of the meter housing in the event of fluid freezing within the meter housing, thereby reducing the possibility of damaging the critical parts of the meter assembly.

Still another object is to provide a reliable, fabricated mass production type of meter housing which will substantially reduce overall costs and replacement. These and other improvements and objects will be apparent from the description, accompanying drawings and appended claims.

Figure 1:
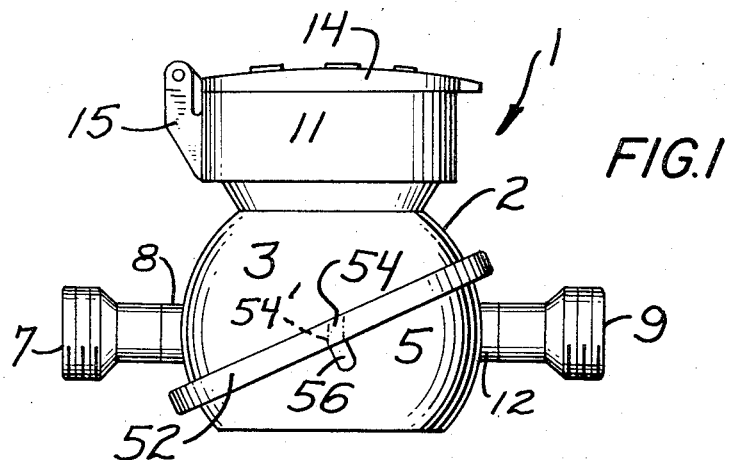
FIG. 1 is a plan view of the exterior of the fabricated meter.
Figure 2:
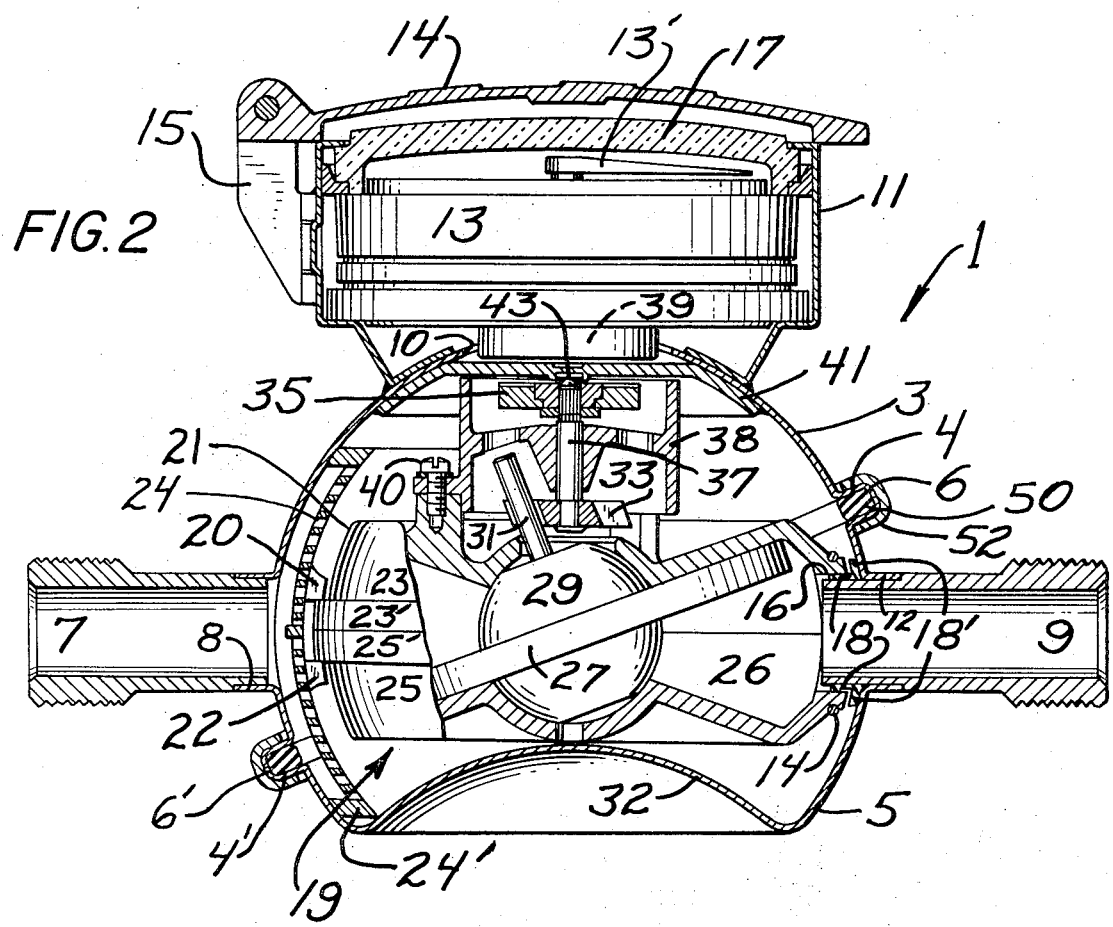
FIG. 2 is a cross sectional view of the fabricated meter housing showing measuring chamber, register, and component parts.

Referring to FIG. 1 and 2, the fluid meter, generally indicated by reference numeral 1, has a fabricated housing 2 comprising two hemispherical complementary elements 3,5. The elements 3,5 are originally stamped from thin sheet metal material by conventional means, such as a drawing operation. Initially, both hemispherical elements 3,5 are identical. However, after subsequent fabrication different to each element, they will then assume their respective positions as upper and lower portions 3,5 respectively, of said housing 2. Elements 3,5 are jointed in a manner whereby a diagonally oriented sealed junction occurs with reference to the horizontal axis of the meter. This diagonally oriented junction enables the measuring chamber assembly to be readily installed and sealed over the outlet conduit in a manner to be described hereinafter. Conduits 7,9 which are horizontally aligned with each other, provide a means for ingress and egress, respectively, of the fluid which passes through the meter 1. Conduits 7,9 are positioned and affixed in housing elements 3,5, respectively, by mechanical means such as welding, soldering, or other well known means, and may be of any desired length or connecting requirements. A register housing 11, which is fabricated from suitable sheet metal and may be formed by conventional techniques, is affixed to the top portion of the hemispherical element 3 in such a manner as to prevent external contamination from entering the register housing 11. Housing 11 is cylindrical to thereby accept a register 13 which is adapted to provide a visual indication of the fluid passing through the meter via pointer 13' in the usual manner. A cover 14 pivotally mounted on standard 15, as clearly shown, provides a means of protecting the glass lens 17 of the register 13.

With reference to FIG. 2, a measuring chamber assembly 19 includes measuring chamber 21, which includes top and bottom halves 23, 25 respectively. Nutating disc 27, centrally positioned and integral with ball portion 29 nutates upon the passage of fluid through the metering chamber 21 thereby imparting a rotary motion to the drive spindle 31 in the usual manner. Drive spindle 31 thereby actuates dog 33 which is affixed to one end of shaft 37, which in turn, simultaneously rotates drive magnet 35 affixed to the other end of said shaft. Shaft 37 is journaled in a cylindrical magnet mounting bracket 38 which is centrally positioned over nutating disc 27 and ball 29 and is affixed to top half 23 of measuring chamber 21 by screw means 40. Driven magnet 39, not shown, is located within register housing 13 and is positioned in proximity to drive magnet 35 to form a driving connection between the two said magnets in the usual well known manner. Thus, as fluid passes through measuring chamber 21, it is obvious that rotation of drive magent 35 will impart rotation to the register 13 through the magnetic coupling formed by the magnets 35, 39.

With further reference to FIG. 2, upper hemispherical element 3, which is diagonally oriented with reference to a horizontal axis, has conduit 7 projecting therefrom. The end of the conduit may be threaded, as shown, for connecting to a source of fluid, or plain if the conduit is soldered to a fluid source, depending on installation specifications. Boss 8, which is extruded from element 3 on a horizontal axis, provides a convenient receptical for the reception and sealing of conduit 7 as hertofor described. Element 3 also has an opening 10 in the vertical central position for placement of a portion of register 13 therein. This portion of the register contains driven magnet 39 (not shown) which is thus positioned in close proximity to drive magnet 35. Partition plate 41 covers opening 10 and is sealed in element 3 to prevent fluid within meter housing 2 from entering register housing 11. This horizontally positioned partition plate 41 enables the magnets 35, 39 to be placed in close proximity with each other thereby increasing their magnetic attraction. Additionally, partition plate 41 contains thrust bearing 43 which minimizes the friction between the component parts and provides a bearing surface for one end of shaft 37. It is apparent from the drawings that plate 41 is substantially thicker than hemispherical elements 3,5, such increase in thickness being necessary to minimize the deflection of the plate 41. However, fabricating housing 2 into a spherical form this provides for the strongest structural shape for the minimal amount of material.

Lower hemispherical element 5, which is also diagonally oriented with reference to a horizontal axis, and has conduit 9 projecting therefrom, similar to element 3. Conduit 9 forms an outlet conduit and extends into the lower hemispherical element 5 a sufficient amount to enable the same to project into measuring chamber 21, as clearly shown so that the conduit may be sealed relative thereto, for purpose to be hereinafter described. Boss 12 is extended from element 5 to again provide a convenient receptical for the reception and sealing of conduit 9.

Top and bottom halves 23, 25 of measuring chamber 21 are secured together at the outlet conduit 9 by means of a retaining ring 14. A portion of conduit 9 extends into an outlet orfice 16 formed by the halves 23,25 of chamber 21, which is adapted to receive the said conduit. The ring 14 also functions to clasp the chamber 21 about the portion of the conduit 9 which extends into the chamber. Conduit seal 18 is positioned in said orfice between outlet conduit 9 and halves 23,25 of measuring chamber 21 to provide a seal therebetween. Also conduit seal 18 has a shoulder 18' projecting therefrom to provide a cushion, if required, between the chamber 21 and hemispherical element 5. Seal 18 thus functions in a novel manner as an axial seal and also as a cushion between chamber 21 and element 5.

The halves 23, 25 of chamber 21 adjacent inlet conduit 7 are clamped together by means of protrusions 20, 22 which extend from screen 24, and overlie shoulder on lip portions 23',25' of the said halves respectively. Screen 24 is prevented from being displaced relative to the spherical housing 2 by means of a frame arrangement 24' on the inlet side of the meter which confines the periphery of the screen. Frame 24' is integral with the screen and prevents rotation of the assembly 19 about outlet conduit 9 since the assembly does not pivot through the center of the spherical housing 2. Thus, any rotation of the assembly 19 about conduit 9 will result in binding of the screen frame 24' and associated assembly 19 against housing 2. Additionally, the top portion of magnet mounting bracket 38 will abut partition plate 41 to restrain any rotation of the chamber about its horizontal axis. However, it is noted that slight axial movement of the chamber 21 is premitted over the outlet seal. Screen 24 may be of spherical shape to fit closely against the inside of housing wall 2 of element 3 and may be either molded or fabricated from perforated metal or wire screen. Although the inlet of the measuring chamber is not shown, it is understood that such inlet is positioned adjacent the outlet and separated therefrom in the usual manner by use of a partition plate 26. It is obvious that chamber halves 23,25 may be retained by other conventional means, such as screws, and must be of sufficient tightness to prevent metered liquid from leaking between chamber 23,25. Lower element 5 has a concave portion 32 which resists the normal test and operating pressures within the meter but can be forced to assume a less concaved, convex or spherical shape in the event the fluid within the meter housing 2 freezes.

Figure 4:
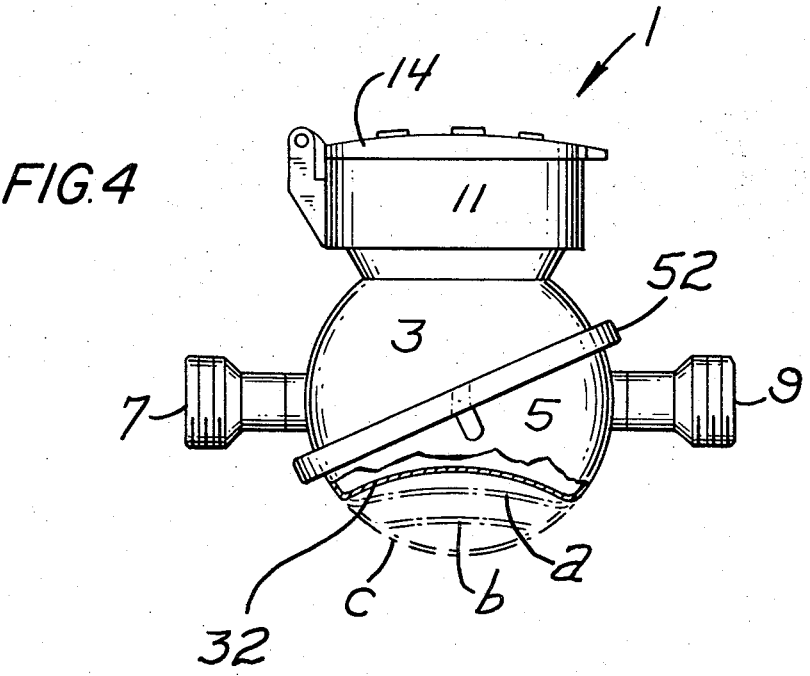

Meters having frost bottom construction heretofor employ a bottom plate which fractures upon freezing of the fluid within the housing. Such meters require repair subsequent to such fracture, before they may be returned to service. The concave bottom portion of the instant meter will progressively deform to a spherical contour upon repeated freezings. Thus, the instant meter housing is capable of withstanding several freezings before fracture will occur. Such progression being clearly shown in FIG. 4 wherein broken lines $a,b,c$, indicate first, second, and third freezes, respectively. It is understood that these are merely exemplary conditions to disclose the effectiveness of the novel construction of the frost bottom, and, numerous intermediate stages of freezing could also occur.

The circumferential edge of hemispherical element 3 has an integral projecting flange 4 extending therefrom which has a depending shoulder 6 for containing O' ring or gasket 50 which is also contained by complementary flange 4' and depending shoulder 6' extending from hemispherical element 5, as clearly shown.

Although depending shoulders 6,6' abut each other to thereby establish a confined area for gasket 50, it is understood that such shoulders could overlap or could be fabricated other ways to thereby establish a sealed joint between respective elements 3,5.

Clamping means 52 retains hemispherical elements 3,5 securely together and also provides the proper amount of compression to gasket 52 to thereby prevent leakage from the meter housing. Clamping means 52 may be a metallic band which is crimped in place around the respective flanges and shoulders by use of conventional crimping tools, or, may be a clamping band which is retained by screws or any other suitable clamping means. Clamping means 52 may be provided with a tear strip means 54 whereby access to the metering chamber may be gained by pulling tab portion 56 to sever the clamping means in the usual well known manner whereby parallel scoring lines 54' form a weakened portion in the clamping means to enable a portion of the said means to be removed by pulling the said tab.

It might be noted that although a stamped metal material is shown in the preferred form for the meter housing, it is possible that a cast spherical housing meter be made of two parts whereby other features of the invention, including the floating metering chamber might be incorporated therein, without departing from the intent of the instant application.

FABRICATION AND ASSEMBLY

The final assembly of the meter consists of joining four major sub-assemblies: the register assembly, the upper hemispherical assembly, the lower hemispherical assembly and the measuring chamber assembly.

Figure 3:
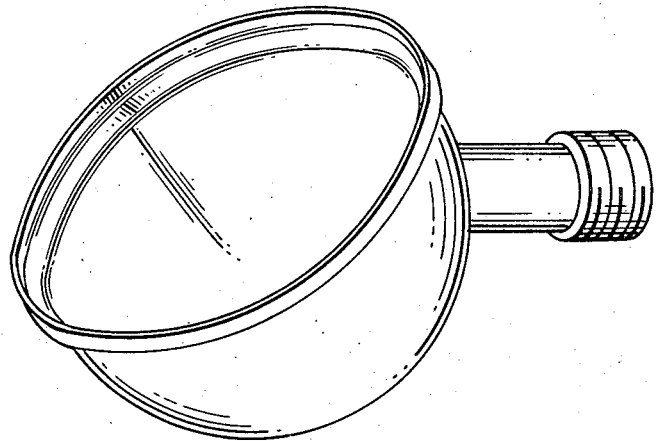
FIG. 3 is a perspective view of a half of the meter housing before fabrication; and, FIG. 4 is a side view of the meter, in partial cross-section, showing the progression of subjecting the meter to freezing conditions.

Hemispherical elements 3,5 are initially formed by a drawing technique whereby both elements 3,5 are identical, each having a boss for their respective conduit therein. FIG. 3 shows one of the elements with its conduit attached. Element 3 would subsequently be fabricated whereby opening 10 is punched, partition plate 41 and conduit 7 is affixed and sealed to said element. Register housing 11 is then attached and sealed to the hemispherical element 3. Lower hemispherical element 5 is fabricated by deforming bottom 32 and inserting and sealing outlet conduit 9.

Measuring chamber assembly 19, which includes the chamber halves 23,25, disc 27 and ball 29, are clamped together by projections 20,22 of screen 24 at one side of the chamber and wherein the other side is clamped together by means of retaining ring 14. The magnet bracket assembly 38, which has dog 33 and driving magnet 35 positioned on shaft 37 and journaled within the bracket, is then affixed to top half 23 of the chamber 21 by screw means 40 to thereby complete the measuring chamber assembly whereby it may be installed in the meter housing. Installation of the measuring chamber in element 5 is accomplished by placing conduit seal 18 over the end portion of conduit 9 which extends into hemispherical element 5. Chamber 19 is then positioned in element 5 by inserting chamber orfice 16 over the extended portion of conduit 9 and seal whereby the seal is positioned between the said orfice and conduit and whereby its shoulder portion 18 is placed between the chamber 21 and element 5.

The lower element, which now includes the measuring chamber assembly 19, is then placed in proximity to top element 3 whereby the two elements are clamped together by clamping means 52 to secure said elements. The register is then placed within the register housing 11 followed by placement of lens 17 thereon. The lens is retained by either a ring or crimping the edge portion of the register housing over the lens. The cover 14 is then affixed to standard 15 to complete assemblage of the meter.

Although a preferred embodiment of the invention has been described herein, it is understood that modifications may readily occur which would fall within the scope and spirit of the invention.

I claim:
1. A fluid meter comprising:
   a. a pair of stamped hemispherical sheet metal elements forming a spherical housing;
   b. a conduit in communication with each of said hemispherical elements, said conduit representing an inlet and outlet for said meter;
   c. a metering chamber positioned in said housing, said chamber having an inlet and outlet communicating with said inlet and outlet, respectively, of said housing, said outlet conduit extending into said metering chamber outlet;
   d. a seal between said outlet and metering chamber outlet, said seal permitting relative movement between the chamber and outlet conduit;
   e. register means for indicating the amount of fluid passing through said chamber; and,
   f. means for securing said elements in fluid tight relationship.

2. A fluid meter as claimed in claim 1 and further including shoulder means extending from said seal adapted to cushion movement between said metering chamber and hemispherical element.

3. A fluid meter as claimed in claim 1 wherein one of said hemispherical elements includes a concave portion adapted to be progressively deformed into its hemispherical contour upon repeated freezing of fluid in said housing.

4. A fluid meter as claimed in claim 1 wherein said elements are joined along a diagonally oriented plane.

5. A fluid meter as claimed in claim 2 and further including a screen positioned within said housing adjacent said inlet; a frame adapted to support and position said screen against said housing; and, means on said screen to support said chamber.

6. A fluid meter as claimed in claim 5 wherein said means on said screen includes protrusions which extend from said screen adapted to overlie and clamp said metering chamber.

7. A fluid meter as claimed in claim 5 and further including a bracket support means secured to the top of said metering chamber, said support means adapted to function as a stop means preventing rotational displacement of said metering chamber about said outlet conduit.

8. A fluid meter as claimed in claim 2 wherein said means to secure said elements in fluid type relationship includes a flange on the circumferential edge on each said hemispherical elements; and, clamping means encircling said flanges adapted to secure said elements in fluid tight relationship.

9. A fluid meter as claimed in claim 8 wherein said clamping means includes a band, said band crimped around said flanges; and, tear strip means on said band adapted to provide removal thereof to thereby gain access to said metering chamber.

10. A fluid meter comprising:
   a. a pair of hemispherical elements forming a spherical housing;
   b. a conduit in communication with each of said hemispherical elements, said conduit representing an inlet and outlet for said meter, wherein said outlet conduit extends into a metering chamber outlet;

a metering chamber positioned in said housing, said chamber having an inlet and outlet communicating with said inlet and outlet, respectively, of said housing;
   d. register means for indicating the amount of fluid passing through said chamber;
   e. means for securing said elements in fluid tight relationship, and,
   f. a seal between said outlet conduit of said metering chamber outlet and said hemispherical element, said seal permitting relative movement between the chamber and outlet conduit.

11. A fluid meter as claimed in claim 10 wherein said elements are joined along a diagonally oriented plane.

12. A fluid meter as claimed in claim 11 and further including a screen positioned within said housing adjacent said inlet; a frame adapted to support and position said screen against said housing; and, means on said screen to support said chamber.

13. A fluid meter as claimed in claim 12 wherein said means includes protrusions which extend from said screen adapted to overlie and clamp said metering chamber.

14. A fluid meter as claimed in claim 13 and further including a bracket support means secured to the top of said metering chamber, and said support means adapted to function as a stop means preventing rotational displacement of said metering chamber about said outlet conduit.

15. A fluid meter as claimed in claim 10 wherein said seal surrounds said outlet conduit and is interposed between said outlet conduit and said metering chamber outlet and wherein said seal further includes integral shoulder means extending outwardly between said metering chamber outlet and its respective hemispherical element, said seal adapted to permit and cushion movement between said metering chamber outlet, said outlet conduit, and said hemispherical element.

* * * * *